Figure 1:
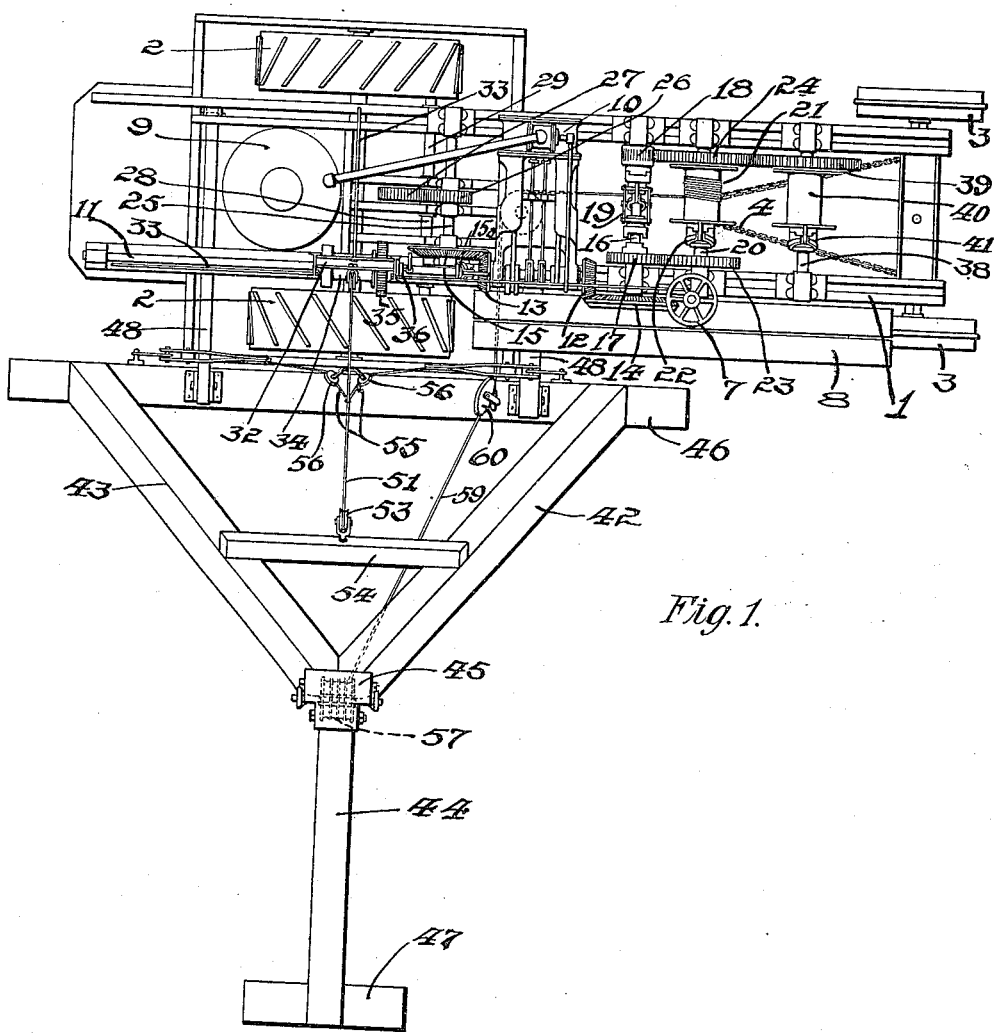

C. F. BURNS.
STUMP PULLER.
APPLICATION FILED APR. 14, 1913.

1,143,358.

Patented June 15, 1915.
3 SHEETS—SHEET 2.

Witnesses

Inventor
Clyde F. Burns
By Charles W. Hill, Atty.

C. F. BURNS.
STUMP PULLER.
APPLICATION FILED APR. 14, 1913.

1,143,358.

Patented June 15, 1915
3 SHEETS—SHEET 3.

Witnesses

Inventor
Clyde F. Burns

UNITED STATES PATENT OFFICE.

CLYDE F. BURNS, OF CHICAGO, ILLINOIS.

STUMP-PULLER.

1,143,358.

Specification of Letters Patent.  Patented June 15, 1915.

Application filed April 14, 1913.  Serial No. 760,889.

*To all whom it may concern:*

Be it known that I, CLYDE F. BURNS, a citizen of the United States, and a resident of the city of Chicago, in the county of Cook and State of Illinois, have invented certain new and useful Improvements in Stump-Pullers; and I do hereby declare that the following is a full, clear, and exact description of the same, reference being had to the accompanying drawings, and to the numbers of reference marked thereon, which form a part of this specification.

A large number of stump pulling devices have been constructed which merely consist of a multiplying gear adapted to be interposed between the stump to be pulled and a suitable anchorage, whereby a substantially horizontal force is applied to the stump, acting to tear the stump from the ground, due to the leverage afforded by the distance between the gripping cable applied around the stump and the roots of the same. It is obvious that in such a construction great difficulty is encountered in pulling very short stumps for the reason that the leverage is a function of the height of the stump, and consequently a horizontal stump pulling gear may sometimes prove inadequate for the purpose.

This invention relates to means for pulling stumps wherein the force applied is directed substantially in line with the stump and in a vertical direction, and the effectiveness of the device is unaffected by the length of the stump.

It is an object of this invention to provide a power driven mechanism adapted to travel from place to place, and equipped with devices such that the power plant may be used for pulling stumps and other purposes.

It is also an object of this invention to provide a tripod frame adapted to be centered over a stump and adjustably connected to a power driven mechanism.

It is also an object of this invention to provide a device having a power plant, and a stump pulling tripod frame, wherein the power plant may be utilized to adjust the tripod frame, pull a stump, or drive the mechanism from place to place.

It is also an object of this invention to provide a self propelling vehicle having a stump pulling member adjustably and flexibly connected thereto.

It is also an object of this invention to provide in combination with a power driven adjustable tripod frame, multiplying gears of various ratios, all driven from a unit power plant.

It is furthermore an object of this invention to provide a device having a tripod frame pivotally connected thereto adapted for adjustment.

It is finally an object of this invention to provide a device capable of a number of simultaneous operations, any one of or combination of which may be effected simultaneously.

The invention (in a preferred form) is illustrated in the drawings, and hereinafter more fully described.

Figure 6:
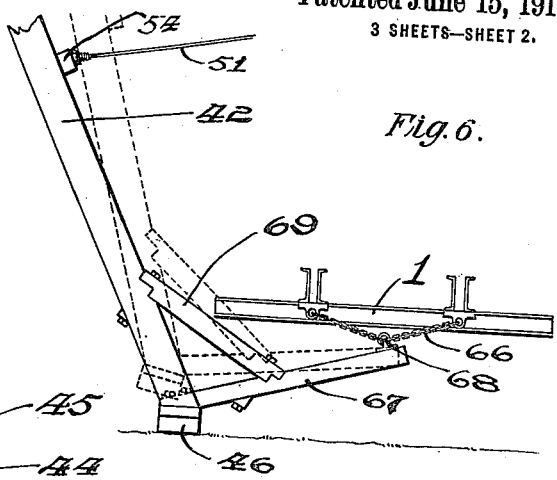
Figure 2:
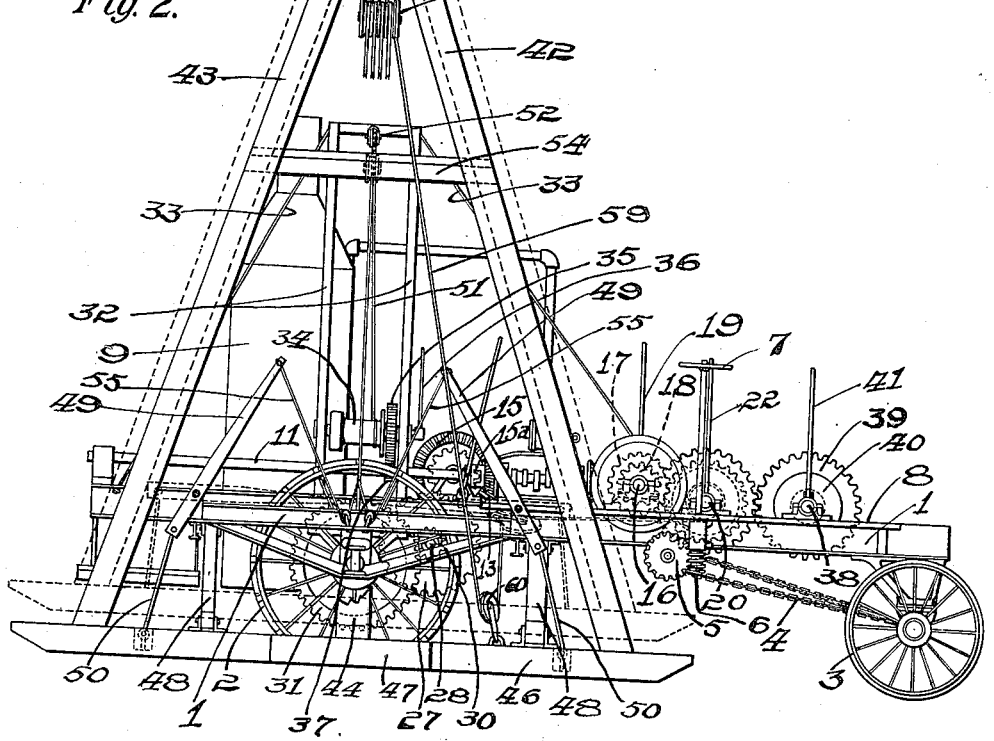
Figure 3:
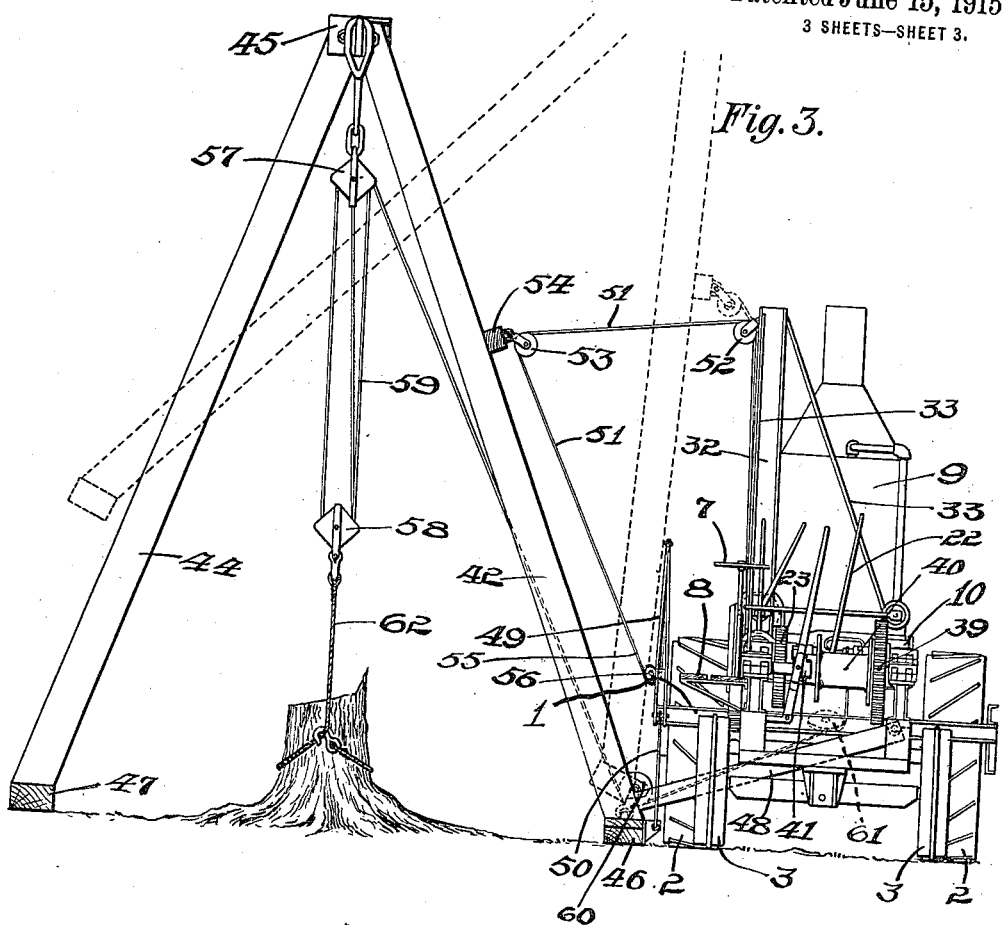
Figure 4:
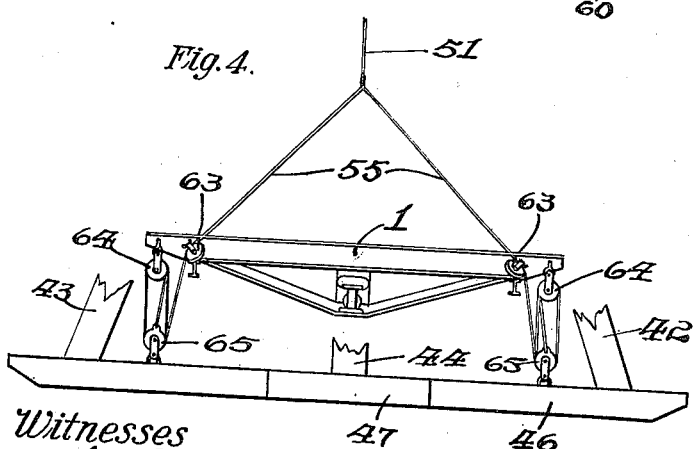
Figure 5:
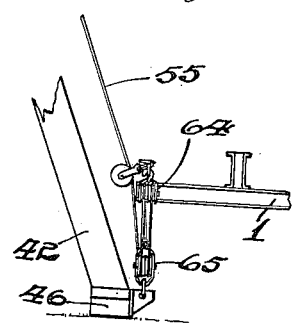

In the drawings: Figure 1 is a top plan view of a device with the tripod lowered to pulling position. Fig. 2 is a side elevation thereof with one leg of the tripod frame broken away, and showing one position of the frame in dotted lines during the elevation thereof from operating position. Fig. 3 is an end elevation of a device connected and in operative position to pull a stump, and with the tripod illustrated fragmentarily in dotted lines in position out of use. Fig. 4 is a fragmentary side elevation of a modification of the adjusting means for the tripod. Fig. 5 is a fragmentary end elevation thereof. Fig. 6 is a fragmentary end elevation of another modification of the connection existing between the tripod and the self propelled power plant.

As shown in the drawings, the power plant is mounted upon a main frame 1, having driving wheels 2, and steering wheels 3, the latter of which are operated by means of a chain 4, wound around a suitable drum driven by the worm wheel 5, which is in turn driven by a worm 6, connected to a steering wheel 7. A running board 8, is provided along one side of the frame to accommodate the operator. The power plant consists of a boiler 9, and steam engine 10, which drives the longitudinal crank shaft 11, for various purposes hereinafter described. Of course any other suitable source of power such as a gasolene or electric motor may be used. Bevel pinions 12, and 13, are secured upon the crank shaft, the former rigidly, and the latter loosely upon the same, said pinions serving to drive respectively the large bevel gears 14, and 15. A clutch 15ª, is provided to connect the loose gear 13, with the crank shaft when desired. The bevel gear 14, is secured upon the shaft 16, which is journaled in suitable bearings upon the main frame 1. Loosely engaged upon said shaft 16, are gears 17, and 18, of different diameters, and mounted therebetween and also on said shaft, is a jaw clutch 19, which may be thrown into engagement with either of said gears 17, and 18, or placed in a neutral position between the two.

Extending transversely of, and mounted in suitable bearings upon the frame, is a drum shaft 20, with a loose drum 21, thereon, and a jaw clutch 22, whereby said drum may be engaged to rotate with said shaft. Rigidly secured on each end of said shaft 20, are gears 23, and 24, respectively meshing with the loose gears 17, and 18, on the shaft 16. The clutch 22, affords a means for disconnecting the drum directly from the driving mechanism when it is desired to rapidly slack the cable and adjust the same about a stump.

The bevel gear 15, is secured upon a jack shaft 25, having a gear 26, thereon, which meshes with any suitable gear 27, of a differential mechanism to drive the shaft sections 28, and 29. Secured on the ends of each shaft section are the pinions 30, which mesh with the gears 31, rigidly secured upon the wheels 2, to drive the same. A gallows frame, denoted as a whole by the reference numeral 32, is rigidly secured to and at one side of the main frame, and is guyed by means of the stays 33. Journaled in the lower portion of said gallows frame, is a drum 34, which may be connected or disconnected to or from the gear 35, as desired by means of the clutch 36. Secured upon the driving shaft 11, is a small pinion 37, which at all times meshes with said gear 35, to drive the same. A shaft 38, is journaled at the forward end of the frame and has secured thereon a gear 39, meshing with the gear 24, to drive a drum 40, through a clutch 41, for any purpose desired, as for instance, drawing the stump puller toward a fixed object over rough or otherwise unsuited ground for the traction driving wheels 2. A tripod is provided for the purpose of receiving the reaction due to a stump being pulled from the ground, and this consists of three spars or leg members 42, 43, and 44, arranged in pyramidal form and secured at their tops or apex, by means of a casting 45. A long continuous shoe 46, connects the lower extremities of the spars 42, and 43, and a short bearing shoe 47, is likewise secured upon the spar member 44.

As shown in Figs. 1, 2, and 3, an adjustable pivotal connection exists between the tripod and the main frame 1. This connection comprises the arms 48, which at one of their extremities are pivoted to the main frame 1, and at the other, are pivotally connected upon the shoe 46, of the tripod. Levers 49, adapted to swing in a vertical plane are also pivoted on said main frame with the short extremities of the levers connected by means of links 50, to said shoe 46. A cable 51, is secured upon the drum 34, and after passing over a sheave 52, at the top of the gallows frame 32, passes around a sheave 53, secured upon the transverse brace member 54, and thence downwardly, dividing at its end into the two branches 55, which are trained about sheaves 56, on the main frame, and are then secured to the extremities of the longer arms of said levers 49. Thus, referring to Fig. 3, when it is desired to elevate the tripod into position out of use, the pull upon the cable 51, applied through the drum 34, draws the upper extremities of the levers 49, downwardly, thereby elevating the shoe 46, by means of the links 50, and when the limit of movement thereof is reached, acting to pull the tripod as a whole into an inclined position, due to the force applied at the sheave 53. A tackle arrangement is suspended from the top of the tripod, comprising the blocks 57, and 58, respectively, each of which consists of a multiplicity of sheaves around which is trained a cable 59. The end of said cable 59, is led downwardly and around a guide sheave 60, mounted on the shoe 46, of the tripod frame, and thence inwardly beneath the main frame 1, around the guide sheave 61, secured thereon, and thence directly to the drum 21, around which it is wound. A stump attaching cable 62, is secured to the block 58, the length of said cable and the height of the tripod being of such relative proportions as to readily provide a means for pulling practically any stump from the ground.

In the modification illustrated in Figs. 4, and 5, the branches 55 of the cable 51, are trained over idle sheaves 63, secured on the main frame 1, and thence downwardly and about the respective tackle rigging comprising the multiple sheaves 64, and 65, the former of which is secured to the main frame 1, and the latter to the shoe 46, of the tripod. Thus it will be seen that the retraction of the cable 51, will act to lift the tripod from the ground by means of the tackle rigging in a manner similar to that effected by the levers shown in Figs. 1, 2, and 3.

In the modification illustrated in Fig. 6, a flexible connection is afforded between the tripod frame and the main frame. This consists of slack chains 66, attached beneath the main frame 1, and the short booms 67, with an eye 68, thereon to which the adjacent ends of the chains 66 are engaged. Said booms 67 are bolted to the tripod preferably on the shoe 46, and are reinforced by means of braces 69, bolted to the booms and to the spars of the tripod. When it is desired to elevate the tripod, the cable 51, is retracted by means of the drum 34, and the tripod moves about the pivot point 68, into an elevated position out of use. It is obvious that in these constructions inequalities in the ground, as well as the strain induced in the tripod due to the pulling of a stump, will not be transmitted to the main frame through the attaching means between the tripod frame and the main frame, owing to the fact that no rigid connection exists therebetween.

The operation is as follows: When it is desired to pull a stump, the machine is placed beside the same and the tripod dropped thereover, with the outer shoe 47, thereof and inner shoe 46, resting upon the ground. The cable 62, is then engaged about the stump and the clutches 19, and 22, each thrown into engagement thereby causing the drum 21 to be driven from the engine, and winding the cable 59, thereupon. Owing to the large multiplication of power effected through the tackle means, the stump is easily pulled from the ground. It is readily apparent that with the tripod properly centered above the stump, the entire reaction due to pulling of the stump from the ground is transmitted through the spars to more securely anchor the tripod in position, and no strain other than that due to the winding of the cable 59, upon the drum 21, which is a relatively small quantity, due to the multiplication of power, is imposed upon the main frame. This is an important feature of the invention as the power plant frame or main frame may be relatively light, though strong enough to withstand the stress brought into play when moving from place to place with the tripod frame carried entirely thereon. Generally in other similar constructions, a crane arrangement mounted directly and entirely upon the main frame has been used but in such constructions all the stresses must be borne by the main frame thus necessitating a heavy structure difficult of movement from place to place.

I am aware that details of construction may be varied through a wide range without departing from the principles of this invention. I therefore do not purpose limiting the patent granted otherwise than necessitated by the prior art.

I claim as my invention:

1. In a device of the class described, a frame, a power plant thereon, a tripod frame, a power plant thereon, a tripod mounted at one side of said frame, tackle adapted to be driven by said power plant to elevate said tripod into a position out of use, booms connected to the lower end at one side of said tripod and at their other ends to said frame to swingingly support the tripod on the frame with the aid of said tackle, block and tackle mounted in said tripod, a sheave at the lower end of the tripod, and a windlass on the frame adapted to receive the end of said last mentioned tackle permitting a stump to be withdrawn from the ground in such manner that the reaction of pull and the tension on the tackle is transmitted through the tripod to the ground relieving the frame of stress.

2. In a device of the class described, a frame, a power plant thereon, a plurality of windlass mechanisms mounted on said frame, gearing adapted to entrain said windlass mechanisms with said power plant simultaneously and independently of one another, a tripod mounted at one side of said frame, booms connected to said tripod, the ends of said booms swingingly supported on said frame, an elevating mechanism for said tripod comprising levers pivoted on the frame, links connected thereto and to said tripod and tackle connected to said levers and trained about one of said windlasses, and a stump pulling block and tackle on said tripod with the tackle thereof trained about one of the windlasses on said frame.

3. In a device of the class described, a frame, a power plant thereon, a plurality of windlasses mounted on said frame, means entraining said windlasses with said power plant to drive the windlasses thereby, a tripod mounted at one side of said frame, links connected to the lower end thereof, levers pivoted on said frame and connected to said links, and means connected to said levers and to one of said windlasses to elevate the tripod.

4. In a device of the class described, a frame, a power plant thereon, a tripod adjustably connected to said frame, levers pivoted on the frame and adapted to elevate said tripod, means driven by the power plant and connected with said levers whereby said levers may be actuated from the power plant, block and tackle lifting means mounted in said tripod, and mechanism on the frame for actuating said means to lift a stump.

5. In a device of the class described, a vehicle frame, a source of power thereon, a stump pulling tripod frame adjustably connected thereto, levers pivoted on said vehicle frame and linked to said tripod frame to elevate the same upon said vehicle frame, and mechanism on said tripod frame and vehicle frame co-acting with one another to transmit power from said source of power to said levers to actuate the latter to lift said tripod frame upon the vehicle frame.

In testimony whereof I have hereunto subscribed my name in the presence of two subscribing witnesses.

CLYDE F. BURNS.

Witnesses:
 CHARLES W. HILLS, Jr.,
 LEON M. REIBSTEIN.